April 4, 1967 — G. T. CORBIN, JR — 3,312,575

METHOD OF MAKING METALLIC-LINED PRESSURE VESSEL

Original Filed Sept. 11, 1963

INVENTOR.
GEORGE T. CORBIN, JR.

BY Howson & Howson

ATTYS.

3,312,575
METHOD OF MAKING METALLIC-LINED PRESSURE VESSEL

George T. Corbin, Jr., 421 Byberry Road,
Huntingdon Valley, Pa. 19006
Continuation of abandoned application Ser. No. 308,143, Sept. 11, 1963. This application Mar. 7, 1966, Ser. No. 532,476
4 Claims. (Cl. 156—151)

This invention relates to a fluid-retaining pressure vessel and method of making it and has for an object the provision of improvements in this art.

This application is a continuation of parent application Ser. No. 308,143, filed Sept. 11, 1963, now abandoned.

In a copending application, Ser. No. 227,330, filed Oct. 1, 1962, now Patent No. 3,214,506, there is disclosed a method and apparatus for casting a disposable mandrel to be used for forming a strong vessel by winding thereon a covering of strand material such as fiber glass united by a strong rigidifying plastic, such as an epoxy or the like, and subsequently removing the mandrel by dissolving it and washing it out with a liquid, such as water. The vessel produced is very strong but cannot be depended upon to retain fluids, such as gases under high pressure. It is usual to provide vessels with very thick heavy metal walls for containing gases under high pressure and they can regularly be seen in use for transporting oxygen, carbon-dioxide, hydrogen, helium, methane, propane and the like.

A vessel made of fiber glass and plastic is extremely strong for its weight. Compared to a steel container for the same pressure capacity a fiber glass and plastic container would weigh only one-third or less and since the weight of the contained gas is relatively negligible, it will be seen that if a fiber glass container could be made to resist gas leakage with certainty it would provide the very high strength and low weight which are so desirable. Such vessels could easily be lifted and handled by one man and eliminate the use of hoists, derricks, additional men and the like now required.

The present invention provides such a desirable light-weight fluid-impervious vessel by disposing a thin metal liner within the strong light weight outer body of the vessel. Such a metal liner can be very thin since it need only provide the desired fluid-tightness, the outer body providing the strength and rigidity needed.

It would be impractical for many reasons to try to coat the inside of a formed container with a very thin layer of metal. First, the space is inaccessible; next, there can be no dependable inspection or certainty of the coating being fluid-impervious; and, further, it would be almost impossible to secure a smooth inner surface and uniform thickness of coating, both very desirable to resist the beginning of rupture.

It would also be impractical to try to make a thin metal vessel and then wind the outer vessel body on it. First, it would be impossible to make an independent vessel with such a thin uniform wall; next, such a vessel would not be self-sustaining for handling; and, further, it would be crushed by the winding operation for forming the body of the vessel.

According to the present invention the desired line fluid-impervious light-weight high-strength vessel is produced by forming a strong, smooth, rigid wash-out type mandrel, forming a thin jacket of fluid-impervious material thereon, forming a strong light vessel body over and adherent to the fluid-impervious jacket while supported on the rigid mandrel, and then washing out the mandrel after the lined vessel body has been completed.

The objects, novel features and advantages of the invention will be apparent from the following description of an exemplary embodiment thereof, reference being made to the accompanying drawings, wherein.

Figure 1:
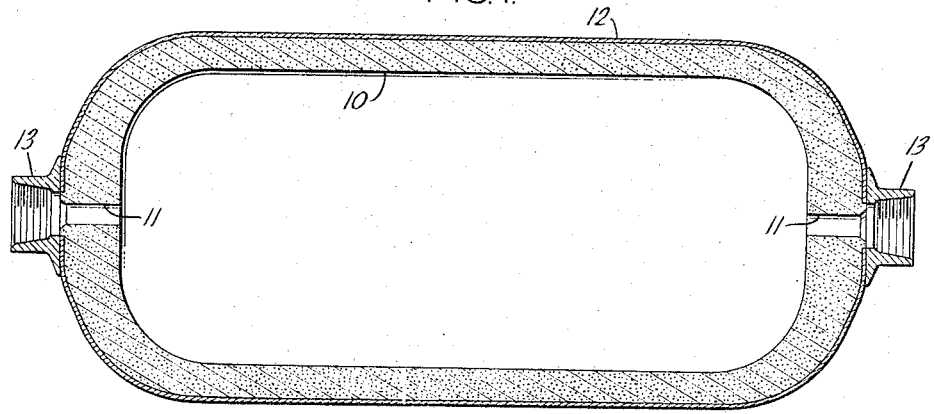
FIG. 1 is a sectional view of a mandrel having formed thereon a fluid impervious jacket.

In FIG. 1 there is shown a hollow mandrel 10 made of a hard, liquid soluble plastic material, such as "Paraplast" marketed by Rezolin Inc. of Santa Monica, California, according to the method and apparatus referred to in the above-mentioned copending application. The mandrel is formed with holes 11 at opposite ends or in at least one end.

Over the mandrel 10 there is formed a thin fluid impervious coating or jacket 12. In one embodiment this coating may be a metal such as ductile nickel and may be applied upon the mandrel, as by electro-forming or electro-plating. It will serve its purpose if no more than .030″ thick.

At the ends of the mandrel there are secured, as by brazing to the metal jacket, base-flanged pole pieces 13 which aid in further operations and serve to hold gas retaining plugs in the finished vessel. The term "brazing" includes soldering. The pole pieces are provided with holes which align with the holes in the mandrel and the holes in the pole pieces are threaded for receiving supporting shaft elements or closure plugs.

Figure 2:
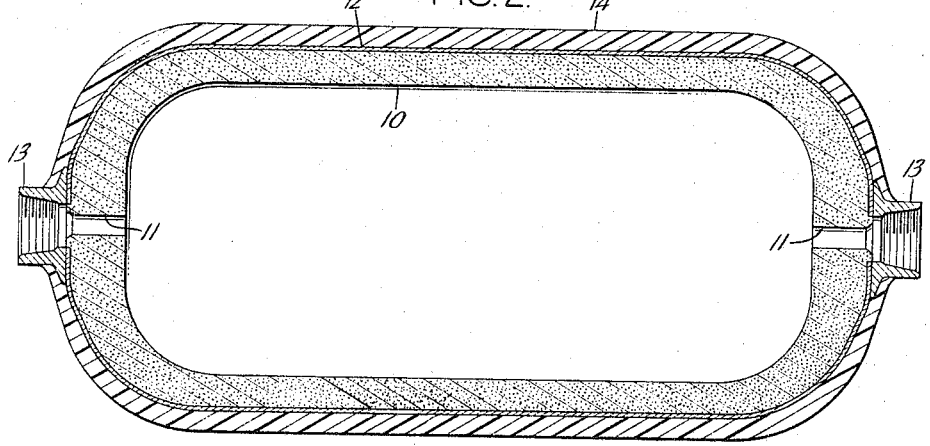
FIG. 2 is a sectional view of the mandrel and jacket with the strong light vessel body formed thereon.
Figure 3:
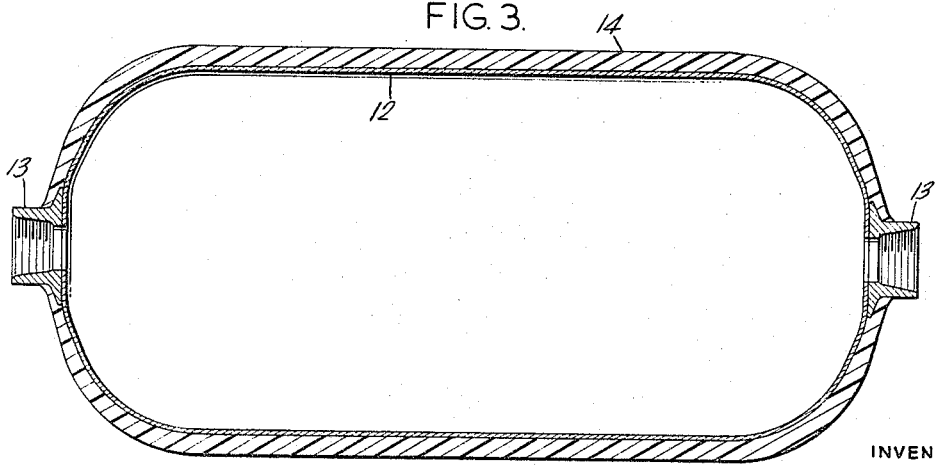
FIG. 3 is a sectional view of the finished vessel after the mandrel has been dissolved in and flushed out by a liquid.

As shown in FIG. 2, a vessel body 14 is formed over the jacket 12 while it is still supported on the mandrel. The body 14 may be formed of fiber glass strands tightly cross wound and impregnated with a strong hardening adhesive, such as an epoxy, in known manner.

After the vessel body 14 has been formed and hardened, the mandrel is removed by dissolving it with liquid and washing it out. The presently preferred mandrel material, mentioned above, is soluble in water. Care is taken during operations to avoid moisture in the air which would damage the mandrel so the plant is one having a controlled atmosphere, low in moisture content.

A vessel body ⅜″ thick provides as much strength against bursting at the pressures used as common portable steel tanks; and since the material does not stretch appreciably at the pressures used, there is no danger of rupturing the thin layer 12 which now forms a gas impervious liner within the strong container body. The pole pieces have base flanges over which the body is wound.

The light, strong, gas-impervious vessel thus formed is very desirable, especially for use in aircraft where weight is such an undesirable factor.

While one embodiment of the invention has been described for purposes of illustration, it is to be understood that there may be various embodiments and modifications within the general scope of the invention.

I claim:

1. The method of making a light-weight high-pressure fluid-storage vessel, which comprises electroforming on a rigid, smooth, fluid-soluble mandrel a substantially uniform fluid-impervious jacket of ductile nickel, forming over said jacket a high-strength, light-weight vessel body of wound strands impregnated with a strong hardening adhesive while said jacket is on said mandrel, and then dissolving said mandrel to separate it from said jacket and to leave said jacket as a liner in said vessel body, said liner being electroformed to a thickness less than that required to prevent bursting thereof if filled with fluid at high pressure in the absence of said vessel body and said vessel body having a thickness sufficient to prevent bursting when said liner is filled with said fluid at high pressure.

2. The method of claim 1 in which said mandrel is water soluble and said dissolving comprises exposing said mandrel to water.

3. The method of claim 1, comprising the step of brazing on said jacket, prior to forming of said vessel body, at least one pole piece having a flanged base disposed against the outside of said jacket and having an aperture therethrough communicating with the interior of said jacket, said vessel body being formed over the flange of said base.

4. The method of making a light-weight high-pressure fluid-storage vessel, which comprises electroforming on a rigid, smooth, fluid-soluble mandrel a substantially uniform fluid-impervious jacket of ductile nickel less than about 0.030 inch in thickness, forming over said jacket a high-strength light-weight vessel body of wound fiber glass strands impregnated with a strong hardening adhesive to provide a vessel thickness a number of times greater than said jacket thickness while said jacket is on said mandrel, and then dissolving said mandrel to separate it from said jacket and to leave said jacket as a liner in said vessel body, whereby said vessel body provides strength to resist bursting due to the high pressures of fluid stored in said vessel and said liner prevents leakage of said fluid through the walls of said vessel.

References Cited by the Examiner

UNITED STATES PATENTS

| 2,826,524 | 3/1958 | Molloy | 156—155 X |
| 3,137,405 | 6/1964 | Gorcey | 220—3 |

FOREIGN PATENTS 747,777    4/1956    Great Britain.

OTHER REFERENCES

IBM, Technical Disclosure Bulletin, "Electrodeposited Thin Metallic Film Elements," J. C. Lloyd et al., col. 3, No. 93, February 1961.

EARL M. BERGERT, *Primary Examiner.*

PHILIP DIER, *Examiner.*